_United States Patent_ [19]

Keller

[11] 4,408,035

[45] Oct. 4, 1983

[54] PHTHALONITRILE RESIN FROM DIPHTHALONITRILE MONOMER AND AMINE

[75] Inventor: Teddy M. Keller, Alexandria, Va.

[73] Assignee: The United States of America as represented by the Secretary of the Navy, Washington, D.C.

[21] Appl. No.: 295,894

[22] Filed: Aug. 24, 1981

[51] Int. Cl.³ .............................................. C08G 83/00
[52] U.S. Cl. ..................................... 528/183; 524/592; 524/600; 528/172; 528/173; 528/206; 528/208; 528/207; 528/210; 528/211; 528/335; 528/348; 528/347; 528/353
[58] Field of Search ............... 528/208, 183, 347, 335, 528/353, 172, 173, 185, 207, 210, 211, 348, 206; 524/600, 592

[56] References Cited

U.S. PATENT DOCUMENTS

| | | | |
|---|---|---|---|
| Re. 28,197 | 10/1974 | Ohfuji et al. | 528/183 |
| 2,245,129 | 6/1941 | Greenewalt | 528/335 |
| 2,324,936 | 7/1943 | Kroeper et al. | 528/335 |
| 4,223,123 | 9/1980 | Keller et al. | 528/210 |
| 4,234,712 | 11/1980 | Keller et al. | 528/9 |
| 4,238,601 | 12/1980 | Keller et al. | 528/206 |

FOREIGN PATENT DOCUMENTS 487912  10/1975  U.S.S.R. ............................. 528/183

_Primary Examiner_—Harold D. Anderson
_Attorney, Agent, or Firm_—Robert F. Beers; William T. Ellis; Thomas E. McDonnell

[57] ABSTRACT

Phthalonitrile resins useful as high-temperature coatings and plastics and in high-temperature composites are obtained by heating a diphthalonitrile monomer with a primary amine from a temperature from about the melting point of the monomer to about the decomposition temperature of the resin. The resins can also be prepared by dissolving a diphthalonitrile monomer in a solvent, e.g. acetonitrile, adding a primary amine to form a suspension, heating the suspension to the B-stage, quenching the suspension, removing the solvent, and heating the residue at a temperature from about its melting point to about the decomposition temperature of the resin.

29 Claims, No Drawings

PHTHALONITRILE RESIN FROM DIPHTHALONITRILE MONOMER AND AMINE

BACKGROUND OF THE INVENTION

The present invention pertains generally to organic synthesis and in particular to a rapid synthesis of a diether-linked polyphthalonitrile resin.

A major advantage of phthalonitrile resins compared to other plastics is their ability to withstand temperature in excess of 200° C. for extended periods without permanent damage to the coatings, plastics or composites made therefrom. Presently, epoxies and polyimides are being used but each has its disadvantages. Conventional epoxy-based composites and adhesives are limited to 120° C. maximum service. Other problems associated with these polymers include their brittleness, water absorptivity and engineering reliability.

Certain phthalonitrile resins are proving to be superior in physical and chemical properties to epoxies, polyimides and other plastics as matrices for fiber-reinforced composites. It is necessary for a resin not to produce gaseous products when cured. Also the chemical make-up of the polymer must be such that it consists of units having known resistance to bond-rupture under thermal, oxidative, and hydrolytic conditions.

Such resins usually contain a substantial proportion of aromatic structures but cured polymers composed solely of aromatic rings tend to be brittle and intractable. If a resin has flexible linkages between the aromatic rings, these disadvantages would be minimized or eliminated. Polyphthalocyanines with diether linkages are materials which meet these goals. Examples of these polyphthalocyanines are found in U.S. Pat. Nos. 4,223,123; 4,226,801; 4,234,712; 4,238,601 by T. M. Keller and J. R. Griffith. However, these monomers are extremely slow to polymerize and cure, generally taking several days and requiring extremely high temperatures.

SUMMARY OF THE INVENTION

It is, therefore, an object of the present invention to cure diether-linked diphthalonitrile monomers in at least about one fourth of the time.

Another object of this invention is to cure diether-linked diphthalonitrile monomers quickly at a much lower temperature.

And another object of this invention is to improve the processability of the diphthalonitrile monomers.

A further object of this invention is to produce a phthalonitrile resin with few or no voids.

A still further object of this invention is to modify the properties of phthalocyanine resins by the introduction of a large variety of organic groups into diphthalonitrile resins.

These and other objects are achieved by admixing a primary amine with a diphthalonitrile monomer and polymerizing the mixture.

DETAILED DESCRIPTION OF THE INVENTION

Although any phthalonitrile monomer capable of forming polymeric materials can be polymerized with the amines of this invention, the advantages of this invention are best realized if the diphthalonitrile monomer has no active hydrogen atoms. These monomers, unlike, e.g., those disclosed and claimed in U.S. Pat. No. 4,056,560 issued to Griffith et al., require several days of continuous heating at 260° to 290° C. before a viscosity increase becomes evident, i.e., before reaching the B-stage of polymerization. Examples of these monomers are those in U.S. Pat. Nos. 3,730,946; 3,763,210; 3,787,475; 3,869,499; 3,972,902, issued to D. R. Heath and J. G. Wirth. These monomers are all di-ether linked, but monomers with other bridges without active hydrogen atoms can be quickly polymerized by the addition of the amines of this invention.

However, the importance of this invention is the rapid polymerization of di-ether linked diphthalonitrile monomers because the ether linkages impart sufficient flexibility to the resin to make the resin an excellent composite resin. Accordingly, the preferred diphthalonitrile monomers are represented by the formula:

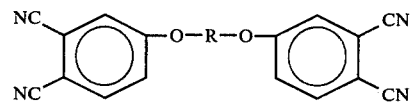

The most preferred diphthalonitrile monomers are those wherein R is selected from the class consisting of

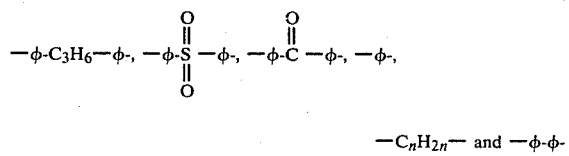

$-C_nH_{2n}-$ and $-\phi-\phi-$ wherein the phenyl groups are linked at the para and the meta positions.

It is possible with the present invention to include a metal or metal salt in the resins. For composite fabrication, a salt or a metal would be less desirable because of problems with homogeneity and gasing. Examples of suitable metal salts include cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and stannous chloride (2TPPO/SnCl$_2$) and mixtures thereof. The metals which can be used include chromium, molybdenum, vanadium, beryllium, silver, mercury, aluminum, tin, lead, antimony, calcium, barium, manganese, magnesium, zinc, copper, iron, cobalt, nickel, palladium, and platinum. Mixtures of these metals may also be used. The preferred metals are copper, silver, and iron.

The amines which greatly increase the polymerization of phthalonitrile monomers having no active hydrogens are primary amines. An accelerated cure is theorized to occur due to the amine initially attacking the nitrile group of the phthalonitrile monomer to produce an N-substituted-3-iminoisoindolenine unit which reacts with other nitrile groups to propagate the polymer. The hypothesized mechanism is represented as follows:

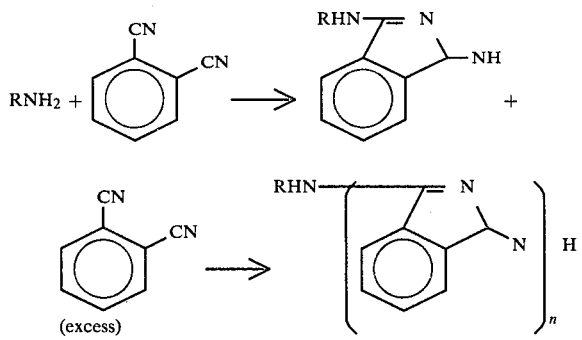

wherein R is an aromatic ring or alkyl radical. It is understood that the above hypothesis is presented as a possible explanation of the surprising improvement in the polymerization time and temperature by the inclusion of a primary amine with a phthalonitrile monomer.

Secondary and tertiary amines have been tried, but have a much weaker effect. This result is probably due to steric hindrance effects of these amines.

For applications which can tolerate voids in the cured resin, a greater number of primary amines can be selected because the boiling point and decomposition temperature of the amine can be lower than those of an amine to be used in a void-free application. The decomposition temperature for this invention is defined as the temperature at which the molecular structure changes to give volatiles. If voids can be tolerated almost any primary amine can be used if enough of the amine is included to compensate for the loss of the amine or a means is provided to recirculate the vaporized amine back through the polymerizing monomer or the polymerization proceeds under pressure. The only amines which can not be used are those which completely decompose at a temperature much below the polymerization temperature.

If voids can not be tolerated in the cured resin, e.g., a resin for graphite composites, then the boiling point and decomposition temperature of the amine must be at least about 50° C. higher than the polymerization temperature and preferably at least 75° C. higher than the polymerization temperature. Examples of amines meeting these minimum temperature requirements are meta- and para- alkylene dianiline wherein the alkylene group has from 1 to 10 carbon atoms, meta- and para-phenylenediamine, aminophenyl ether, aminophthalonitrile, cyclohexanebis(alkylamine) wherein the alkyl group has from 1 to 10 carbon atoms, alkylamine wherein the alkyl group has from 15 to 25 carbon atoms, and aminophenylsulfone. The preferred amines of this group are meta- and para-phenylenediamine, meta and para-methylene dianiline, 4-aminophenyl ether, 4-aminophthalonitrile, 1,4-cyclohexanebis(methylamine), and 4-aminophenylsulfone. The amines (4-aminophenylsulfone and 4-aminophthalonitrile) are most preferred on account of their high boiling points, low vapor pressures, high decomposition temperatures and their lower degree of reactivity which permits a large amount, up to 20 percent of the total resin weight, to be added to the monomer and a large degree of control over the rate of polymerization and cure.

The polymerization of the phthalonitrile can be carried out by two methods: heat polymerization and solvent polymerization. Since the importance of this invention is the rapid polymerization of certain diphthalonitrile monomers useful in fabricating composites, heat polymerization is preferred because of the potential void problems from entrapped solvent molecules in the solvent processing method. The advantage of solvent processing is the much lower processing temperature, thus permitting many more amines to be used.

Heat polymerization comprises admixing a phthalonitrile with an amine at a temperature from at least about the melting point of the monomer to about the decomposition temperature of the resulting resin until the monomer has been completely polymerized. The preferred polymerization temperature is from 10° C. above the melting point of the monomer to 30° C. below the decomposition temperature of the resin. Polymerization can be carried out at one temperature or in several steps over a series of temperatures.

It is possible to terminate the polymerization at the B-stage which is determined by an increase in viscosity. Upon cooling, the B-staged prepolymer is a frangible solid which can be broken into a powder. The powder can be stored for a long period of time if kept at a temperature below 100° C. and away from u.v. exposure. To use the B-staged prepolymer the powder is placed in a mold or admixed with, e.g., graphite fibers and is heated to the above cure temperature range. The cure proceeds as previously.

The amount of an amine to be added depends on the reactivity of the amine and the amount of voids which can be tolerated. For void-free usage, the preferred amines can be divided into three groups. The first group comprises 4-aminophenylsulfone and 4-aminophthalonitrile and can be added in an amount from about 1 to about 20 percent of the total resin weight and preferably from 5 to 15 weight percent. The second group comprises cyclohexane bis(methylamine) and hexadecylamine. This group can be added in an amount from about 1 to about 15 percent of the total resin weight and preferably from 3 to 10 weight percent. The third and most reactive group comprises meta- and para-methylene dianiline, meta- and para-phenylenediamine, and aminophenyl ether, and 4,4'-(p-phenylenedioxy) dianiline. This group can be added in amount from about 1 to about 10 percent of the total composition weight and preferably from 3 to 7 weight percent. It should be noted the amount of amine which can be added without causing voids depends on the processing temperature. The preferred amounts are based on a polymerization temperature within the lower half of the polymerization temperature range.

If voids in the cured resin is not objectionable an amount of amine up to about 40 weight percent can be added. The precise upper limit is the stoichiometric amount. Unreacted amine would be detrimental to the overall physical properties of the cured phthalonitrile resin. If the amine is less than about one percent, the improvement would be minimal and of little value.

Solvent polymerization comprises dissolving a phthalonitrile monomer in a solvent to form a solution, adding a primary amine to form a suspension, heating the suspension until the B-stage is reached, quenching the B-staged prepolymer to room temperature, removing the solvent by reduced pressure, polymerizing the B-staged prepolymer to the C-stage by heating the prepolymer to the polymerization-temperature range. Examples of suitable solvents are acetonitrile, methylene chloride, chloroform, toluene, and mono- and di-chlorobenzene. The preferred solvents are acetonitrile and toluene.

The decomposition and/or evaporization problems, which limits the choice of amine curing agent in the heat polymerization method, can be eliminated by the proper solvent selection. Further, the lower temperatures of the system would permit a larger amount of amine to be used without causing the monomer to polymerize too quickly or create a void problem. Thus, the wide range of about 1 to about a stoichiometric amount of a primary amine would apply to solvent polymerization. The preferred range is 1 to 20 weight percent and the most preferred amount is 7 to 15 weight percent. Further, the lower temperature would not require the amines to be broken into different classes.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

Bisphenol-A-phthalonitrile monomer (1.0 g, 2.1 mmol) and 4,4'-(p-phenylenedioxy) dianiline (0.03 g, 0.10 mmol) were placed in an aluminum planchet, melted, and mixed by stirring on top of a hot plate at 220° C. It took about 10 minutes before any visual color changes was observed. After 25 minutes at 220° C., the sample was darkening rapidly and increasing in viscosity. The sample was then heated in an oven at 250° C. for 20 hours (overnight), at 280° C. for 6 hours, and finally at 320° C. for 18 hours. The polymer was strongly bonded to the aluminum surface and appeared to be tough.

EXAMPLE 2

Bisphenol-A-phthalonitrile monomer (1.0 g, 2.1 mmol) and 4,4'-(p-phenylenedioxy) dianiline (0.03 g, 0.10 mmol) were melted and mixed in an aluminum planchet on top of a hot plate at 220° C. The sample was then placed in an oven at 240° C. After 3 hours of heating, the sample had gelled. The sample was then heated overnight (18 hours) at 260° C. and postcured at 290° C. for 6 hours.

EXAMPLE 3

Bisphenol-A-phthalonitrile monomer (1.0 g, 2.1 mmol) and 4,4'-(p-phenylenedioxy) dianiline (0.01 g, 0.03 mmol) were melted and thoroughly mixed in an aluminum planchet. After 3 hours of heating at 240° C., the sample had darken and increased somewhat in viscosity. After 18 hours at 240° C., it was observed that the sample had not completely solidified. The temperature was then increased to 260° C., which caused the sample to remelt. After 18 hours at 260° C., the sample still had not gelled. The sample was then transferred to an oven set at 290° C. and heated for 40 hours, which resulted in its solidification to a tough, polymeric material.

EXAMPLE 4

Bisphenol-A-phthalonitrile monomer (1.0 g, 2.1 mmol) and 4,4'-(p-phenylenedioxy) dianiline (0.10 g, 0.34 mmol) were melted and mixed thoroughly in an aluminum planchet at 220° C. The color of sample changed rapidly from clear to orange to dark green. At the dark green stage, a rapid increased in viscosity was observed. After approximately 25 minutes at 220° C., the sample had solidified and was heated for an additional 3 hours at 220° C. and postcured for 2 hours at 290° C. to ensure complete polymerization.

EXAMPLE 5

Bisphenol-A-phthalonitrile monomer (11.0 g, 22.9 mmol) and p-phenylenediamine (0.01 g, 0.09 mmol) were melted and mixed in an aluminum planchet. The resulting sample was placed in an oven at 250° C. and heated for 2 days. At this time, it was observed that the melt had increased in viscosity. To speed up the polymerization process, the temperature was increased to 280° C., and the sample was heated at this temperature for 3 days. The sample had gelled after 2 days and was heated the additional day to ensure complete polymerization.

EXAMPLE 6

Bisphenol-A-phthalonitrile monomer (1.0 g, 2.1 mmol) and p-phenylenediamine (0.01 g, 0.09 mmol) were melted and mixed in an aluminum planchet. The melt was placed in an oven and heated at 240° C. for 18 hours. The sample was still slightly soft. The sample was then heated at 280° C. for approximately 4 hours. After 2 hours at 280° C., the sample had solidified into a tough, dark green polymeric material.

EXAMPLE 7

Bisphenol-A-phthalonitrile monomer (1.0 g, 2.1 mmol) and p-phenylenediamine (0.02 g, 0.18 mmol) were melted and mixed in an aluminum planchet. The sample was then placed in an oven and heated at 240° C. for 6 hours. The sample had solidified after 4 hours. It was then postcured at 280° C. for 18 hours (overnight) to ensure complete polymerization.

EXAMPLE 8

Bisphenol-A-phthalonitrile monomer (1.4 g, 2.9 mmol) and 4,4'-methylenedianiline (0.09 g, 0.45 mmol) were melted and mixed in an aluminum planchet. After approximately 30 minutes of heating at 225° C., the melt had become extremely viscous and gelled shortly thereafter. The sample was then postcured at 280° C. for 22 hours (overnight). The polymer appeared tough and contained some voids, which can be eliminated by curing the sample for a longer time at 225° C.

EXAMPLE 9

Bisphenol-A-phthalonitrile monomer (1.5 g, 3.1 mmol) and 4,4'-methylenedianiline (0.06 g, 3.0 mmol) were melted and mixed in an aluminum planchet. The sample was cured at 210° C. for 18 hours, at 220° C. for 3 hours, and at 230° C. for 18 hours. The polymer was void free and appeared tough.

EXAMPLE 10

Bisphenol-A-phthalonitrile monomer (1.5 g, 3.1 mmol) and 4-aminophenyl ether (0.03 g, 0.15 mmol) were melted and mixed in an aluminum planchet. The sample was cured at 230° C. for 18 hours. The polymer still appeared to be somewhat brittle. The sample was then postcured at 260° C. for 18 hours to afford a tough polymeric material.

EXAMPLE 11

Bisphenol-A-phthalonitrile monomer (0.9 g, 1.9 mmol) and 4-aminophthalonitrile (0.10 g, 0.70 mmol) were melted and mixed in an aluminum planchet. After 30 minutes of heating at 230° C. on top of a hot plate, the melt had taken-on a slight green coloration. At this time, the sample was placed in an oven at 230° C. and heated for 4 hours. The sample, had darkened to a deep green and had become quite viscous after 1 hours. After 1.5 hours, gelatin had occurred. The polymer was then postcured at 280° C. for 4 hours, was void-free, and appeared to be tough.

EXAMPLE 12

Bisphenol-A-phthalonitrile monomer (1.0 g, 2.1 mmol) and (0.02 g, 0.14 mmol) 1,4-cyclohexanebis (methylamine) were melted and mixed in an aluminum planchet. The melt was placed in an oven and heated at 220° C. for 18 hours. During the initial stage of heating, it was observed that volatiles were ensuing from the melt which are probably attributed to the amine additive since the phthalonitrile monomer does not vaporized at this temperature. Moreover, the sample failed to solidified but had become fairly viscous during the heat treatment at 220° C. The sample was then heated at 240° C. for 72 hours (weekend). After 6 hours at 240° C., the sample had solidified.

EXAMPLE 13

Bisphenol A phthalonitrile monomer (1.0 g) and hexadecylamine (0.06 g) were melted, mixed by stirring, and heated at 230° C. for 30 minutes on a hot plate. During this time, the melt slowly turned to a light green; and volatiles, which were attributed to the amine, were observed evaporating from the sample. Thus, an unknown quantity of curing additive was lost before it had reacted with the phthalonitrile polymerization sites. The light green melt was placed in an oven at 230° C. and heated for 20 hours. The resulting dark green melt had increased somewhat in viscosity. The temperature was increased to 270° C., and the dark green sample was heated for 28 hours. Sometimes during the latter 22 hours, the sample solidified. The polymer appeared fairly tough.

EXAMPLE 14

Bisphenol-A-phthalonitrile monomer (0.95 g, 2.0 mmol) and 4-aminophenyl sulfone (0.05 g, 0.20 mmol) were melted and mixed in an aluminum planchet. The melt was placed in an oven at 225° C. After 1.5 hours, no visible color change was evident. Sometimes during the next 1.5 hours, the sample had taken on a deep green color and had solidified. The sample was then heated at 250° C. for 2 hours, at 280° C. and at 310° C. for 18 hours. The degree of polymerization had apparently occurred extensively, since the void-free polymer appeared to be tough. This amine appeared to be ideal for composite formulations involving phthalonitrile resins due to the initial slow initiation reaction relative to the more reactive amines.

EXAMPLE 15

Bisphenol-A-phthalonitrile monomer (0.90 g, 1.9 mmol) and 4-aminophenyl sulfone (0.12 g, 0.50 mmol) were melted and mixed in an aluminum planchet. The melt was heated at 225° C. for 4 hours. After 2 hours, the melt had taken on a slightly yellow coloration. During the final 2 hours, the sample had gelled but was still rubbery. The sample was then heated at 260° C. for 24 hours and at 310° C. for 4 hours. Again, the cured polymer appeared tough.

The results of TGA analyses, measured in nitrogen at a heating rate of 10° C. per minute, on some of the examples are summarized in Table 1, which gives the compositions of the samples, the cure schedules used and the temperatures at which the samples have lost 1%, 5%, 10%, 20% and 30% of their original weight, as well as the weight percent lost up to the final temperature of 700° C. The results indicate that the samples of bisphenol-A phthalonitrile containing additives not only cure faster, but are more thermally stable than bisphenol-A phthalonitrile cured alone. Bisphenol-A phthalonitrile is designated as Bis-A-phth and is the phthalonitrile having the bridge —O—$\phi$+$\phi$—O— or (—O—$\phi$—$C_3H_6$—$\phi$—O—).

DSC measurements were completed on samples listed in Table 1. For the uncured bisphenol-A-phthalonitrile, the DSC showed only a single sharp endotherm in the region of the melting point. The mixture with 4-aminophenyl ether also showed sharp endotherms in that region as well as 3 or 4 exo- and endothermic peaks between room temperature and 180° C. In the case of the 4-aminophenyl ether sample these peaks disappeared after the first DSC run. The sample with methylene dianiline did not have the 197° C. endotherm. Instead there was a broad endotherm peaking at 177° C., in addition to a sharp endotherm at 87° C. and a small exotherm at 72° C. The DSC runs of polymeric materials cured according to the schedules given in Table 1 show no significant peaks.

Specimens for fracture toughness ($G_{Ic}$) and bending modulus measurements were cut from 4"×4"×¼" samples cured according to the cure schedules given in Table 1. Fracture toughness was measured using rectangular compact tensile-test specimens. Bending modulus measurements were made on a four-point bending apparatus. The results for two "amines modified" bisphenol-A-phthalonitrile samples are given in Table 2, along with data for neat bisphenol-A-phthalonitrile and Narmco-5208 epoxy resin. The results indicate that the additives caused no significant change in the physical properties of the cured bisphenol-A-phthalonitrile.

TABLE 1

TGA DATA FOR BISPHENOL-A PHTHALONITRILE

| Additive | Cure | 1% Wt Loss | 5% Wt Loss | 10% Wt Loss | 20% Wt Loss | 30% Wt Loss | Total % Wt Loss to 700° C. |
|---|---|---|---|---|---|---|---|
| None | 7 days, 280° | 350 | 410 | 440 | 475 | 510 | 48 |
| 3 Wt % 4-$NH_2$—phenyl ether | ¾ hr, 230° 4¾ hr, 260° 43 hrs, 280° | 420 | 465 | 485 | 535 | — | 29 |
| 3 Wt % Methylene dianiline | 1¼ hr, 230° 4 hrs, 260° 19 hrs, 280° | 405 | 460 | 485 | 520 | 625 | 33 |

TABLE 2
FRACTURE TOUGHNESS AND BENDING MODULI OF MODIFIED BISPHENOL-A PHTHALONITRILES

| Sample | Fracture Toughness $G_{Ic}(J/m^2)$ | Bending Modulus $E\ (GN/m^2)$ |
| --- | --- | --- |
| Bis-A Phth + 3% 4-NH$_2$—phenyl ether | 101 | 3.6 |
| Bis-A Phth + 3% Methylene dianiline | 73 | 3.7 |
| Bis-A Phth | 99 | 3.9 |
| Narmco 5208 Resin | 76 | 3.9 |

The phthalonitrile resins of this invention have a significantly lower cure time and temperature than comparable resins polymerized neat which require several days of continuous heating at 260°–290° C. before a viscosity increase becomes evident. These resins are more thermally stable than the comparable neat-polymerized resins, which are very thermally stable. Thus they provide a new matrix material with long-term operational capability in excess of 250° C. and with the ability to retain reinforcing fibers during or following exposure to a fire environment. These resins, like their neat counterparts, are insensitive to high humidity and are highly unreactive at ambient temperatures. On account of the greatly improved processability, and the relative low cost of the other reagents, the cost of the resin is largely dependent on the cost of 4-nitrophthalonitrile, which is not extremely expensive.

Throughout the specification and the claims to follow, all weight percents are based on the total resin weight. Obviously many modifications and variations of the present invention are possible in light of the above teaching. It is therefore to be understood that within the scope of the appended claims the invention may be practiced otherwise than as specifically described herein.

What is claimed is:

1. A phthalontrile resin obtained by admixing a primary amine in an amount from about 1 to about 40 percent of total resin weight with a diphthalonitrile monomer at a temperature from about the melting point of said phthalonitrile monomer to about the decomposition temperature of the resulting resin.

2. The resin of claim 1 wherein said diphthalonitrile monomer has an ether bridge.

3. The resin of claim 1 wherein said diphthalonitrile monomer has a bridge represented by the formula: O—R—O wherein R is selected from the group consisting of diphenylene isopropane, diphenylene sulfonce, diphenylene, alkylene, diphenylene ketone, and phenylene wherein said phenylene groups are linked at the para and meta positions.

4. The resin of claim 3 wherein said amine has a boiling point and decomposition temperature of at least about 50° C. in excess of the temperature at which the mixture is heated.

5. The resin of claim 4 wherein said amine has a boiling point and decomposition temperature of at least about 75° C. in excess of the temperature at which the mixture is heated.

6. The resin of claim 4 wherein said amine is selected from the class consisting of meta- and para-phenylenediamine, meta- and para-alkylene dianiline, aminophenyl ether, amino phthalonitrile, cyclohexane bis(alkylamine) wherein said alkyl group has from 1 to 10 carbon atoms, alkylamine or alkyldiamine wherein said alkyl group has from 15 to 25 carbon atoms, and aminophenylsulfone.

7. The resin of claim 6 wherein the alkyl group of cyclohexane bis (alkylamine) is methyl and the alkyl group of alkylamine is hexadecyl.

8. The resin of claim 6 wherein said amine is selected from the class consisting of 4-aminophenylsulfone, and 4-aminophthalonitrile.

9. The resin of claim 6 wherein said amine is selected from the class consisting of meta- and para-methylene dianiline and meta- and para-phenylenediamine.

10. The resin of claim 6 wherein said amine is selected from the class consisting of 4-aminophenyl ether, cyclohexane bis(methylamine), and hexadecylamine.

11. The resin of claim 8 wherein the amount of said amine is from about 1 to about 20 percent of total resin weight.

12. The resin of claim 8 wherein the amount of said amine is from 5 to 15 percent of total resin weight.

13. The resin of claim 9 wherein the amount of said amine is from about 1 to about 10 percent of total resin weight.

14. The resin of claim 9 wherein the amount of said amine is from 1 to 5 percent of total resin weight.

15. The resin of claim 10 wherein the amount of said amine is from about 1 to about 15 percent of total resin weight.

16. The resin of claim 10 wherein the amount of said amine is from 3 to 10 percent of total resin weight.

17. The resin of claim 1 which further comprises a metal.

18. The resin of claim 1 which further comprises a metal salt.

19. The resin of claim 6 which further comprises a metal.

20. The resin of claim 6 which further comprises a metal salt.

21. A phthalonitrile resin obtained by forming a solution of a diphthalonitrile monomer; admixing said solution with an amount from about 1 to 40 percent of total resin weight of a primary amine having a boiling point and a decomposition temperature of at least about 50° C. in excess of the boiling point of said solution to form a suspension; heating said suspension until the B-stage of said resin is reached; quenching said B-staged resin; removing said solvent by reduced pressure to form a frangible solid; and heating said solid, until the C-stage of said resin is reached, at a temperature from at least about the melting point of said solid to about the decomposition temperature of said C-staged phthalonitrile resin.

22. The phthalonitrile of claim 21 wherein said diphthalonitrile monomer has an ether-linked bridge.

23. The resin of claim 22 wherein said amine has a boiling point and a decomposition temperature of at least 75° C. in excess of the boiling point of said solvent.

24. The resin of claim 22 wherein said amine is selected from the class consisting of meta- and para-phenylenediamine, meta- and para-alkylene dianiline wherein the alkylene group has from 1 to 10 carbon atoms, aminophenyl ether, aminophthalonitrile, cyclohexane bis(alkylamine) wherein the alkyl group has from 1 to 10 carbon atoms, alkylamine diamine wherein said alkyl group has from 15 to 25 carbon atoms, and aminophenylsulfone.

25. The resin of claim 22 wherein said amine is selected from the class consisting of meta- and para-phenylenediamine, meta- and para-methylene dianiline, 4-aminophenyl ether, 4-aminophthalonitrile, cyclohexane bis(methylamine) and 4-aminophenylsulfone.

26. The resin of claim 23 wherein said amine is added in an amount from about 1 to 20 percent of total resin weight.

27. The resin of claim 23 wherein said amine is added in an amount from 7 to 15 percent of total resin weight.

28. The resin of claim 25 wherein said solvent is selected from the class consisting of acetonitrile, methylene chloride, chloroform, toluene, and mono- and di-chlorobenzene.

29. The resin of claim 25 wherein said solvent is acetonitrile.

* * * * *